(12) United States Patent
Creviston et al.

(10) Patent No.: US 7,274,121 B2
(45) Date of Patent: Sep. 25, 2007

(54) SYSTEMS AND METHODS FOR FASTENING INTERNAL COOLING FANS TO CLAW-POLE ELECTRO-MECHANICAL MACHINES

(75) Inventors: Alex Creviston, Muncie, IN (US); Michael McCord, Anderson, IN (US); Chris Bledsoe, Anderson, IN (US); David Maley, Anderson, IN (US)

(73) Assignee: Remy Inc., Anderson, IN (US)

( * ) Notice: Subject to any disclaimer, the term of this patent is extended or adjusted under 35 U.S.C. 154(b) by 0 days.

(21) Appl. No.: 11/071,439

(22) Filed: Mar. 4, 2005

(65) Prior Publication Data

US 2006/0197403 A1    Sep. 7, 2006

(51) Int. Cl.
*H02K 7/00* (2006.01)
*H02K 1/00* (2006.01)

(52) U.S. Cl. .......................................... 310/58; 310/263

(58) Field of Classification Search ................. 310/58, 310/60 R, 61–63, 263, 261; 416/204 R, 416/206, 210 R, 203, 247 R, 237; 417/353–354, 417/360, 368, 422, 423.1, 423.12, 423.14, 417/423.15, 424.1, 424.2
See application file for complete search history.

(56) References Cited

U.S. PATENT DOCUMENTS

| | | | |
|---|---|---|---|
| 3,765,295 A * | 10/1973 | Ptak | 411/41 |
| 3,906,266 A | 9/1975 | Cowman | |
| 3,973,151 A | 8/1976 | Bowcott | |
| 4,301,589 A * | 11/1981 | Fredriksson | 29/283 |
| 4,322,647 A | 3/1982 | Neroda et al. | |
| 4,418,295 A * | 11/1983 | Shiga | 310/59 |
| 4,469,968 A | 9/1984 | Jaeschke | |
| 4,686,399 A * | 8/1987 | Imori et al. | 310/62 |
| 5,152,114 A * | 10/1992 | Beazley et al. | 52/264 |
| 5,329,199 A | 7/1994 | Yockey et al. | |
| 5,464,323 A * | 11/1995 | Scofield | 416/134 R |
| 5,977,668 A | 11/1999 | Yoshioka | |
| 6,454,534 B1 * | 9/2002 | Burnett et al. | 416/190 |
| 6,538,352 B2 | 3/2003 | Asao | |
| 6,616,411 B2 * | 9/2003 | Sheidler et al. | 416/237 |

(Continued)

FOREIGN PATENT DOCUMENTS

JP         4-200255         7/1992

(Continued)

*Primary Examiner*—Tran Nguyen
(74) *Attorney, Agent, or Firm*—Finnegan, Henderson, Farabow, Garrett & Dunner, L.L.P.

(57) ABSTRACT

Methods, systems, and articles of manufacture for fastening internal cooling fans to claw-pole segments are provided. A claw-pole segment suitable for use in a rotor of an electro-mechanical machine is formed. The claw-pole segment may include a base portion, at least one claw pole projecting axially from the base in a first direction, and at least one protrusion projecting axially from the base in a second direction opposite the first direction. A fan assembly that attaches to the claw-pole segment is also formed. The fan assembly may include at least one opening for receiving the at least one protrusion, and may be formed with varying configurations to affect the frequency response of the fan. The portion of the at least one protrusion extends through and beyond the opening of the fan assembly when the fan assembly is mounted on the claw-pole segment and expands in response to an application of an axial load, to secure the fan assembly to the claw-pole segment.

17 Claims, 7 Drawing Sheets

U.S. PATENT DOCUMENTS

| | | | |
|---|---|---|---|
| 6,634,855 B1 * | 10/2003 | Rollo | 415/206 |
| 6,648,602 B2 * | 11/2003 | Horng et al. | 416/203 |
| 6,703,759 B2 | 3/2004 | Oohashi et al. | |
| 6,812,602 B2 * | 11/2004 | York | 310/62 |
| 6,890,159 B2 * | 5/2005 | Motomura | 417/423.12 |
| 2005/0006975 A1 | 1/2005 | Bradfield et al. | |

FOREIGN PATENT DOCUMENTS

| | | | |
|---|---|---|---|
| JP | 2002227828 A * | 8/2002 | |

* cited by examiner

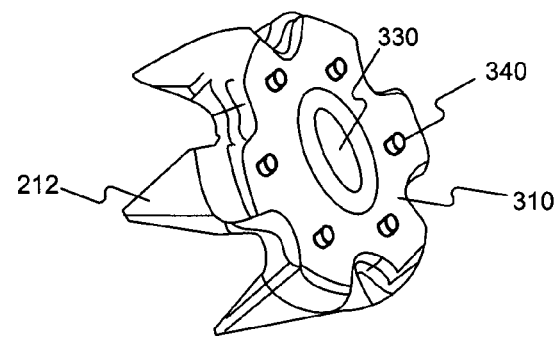
Fig. 3A
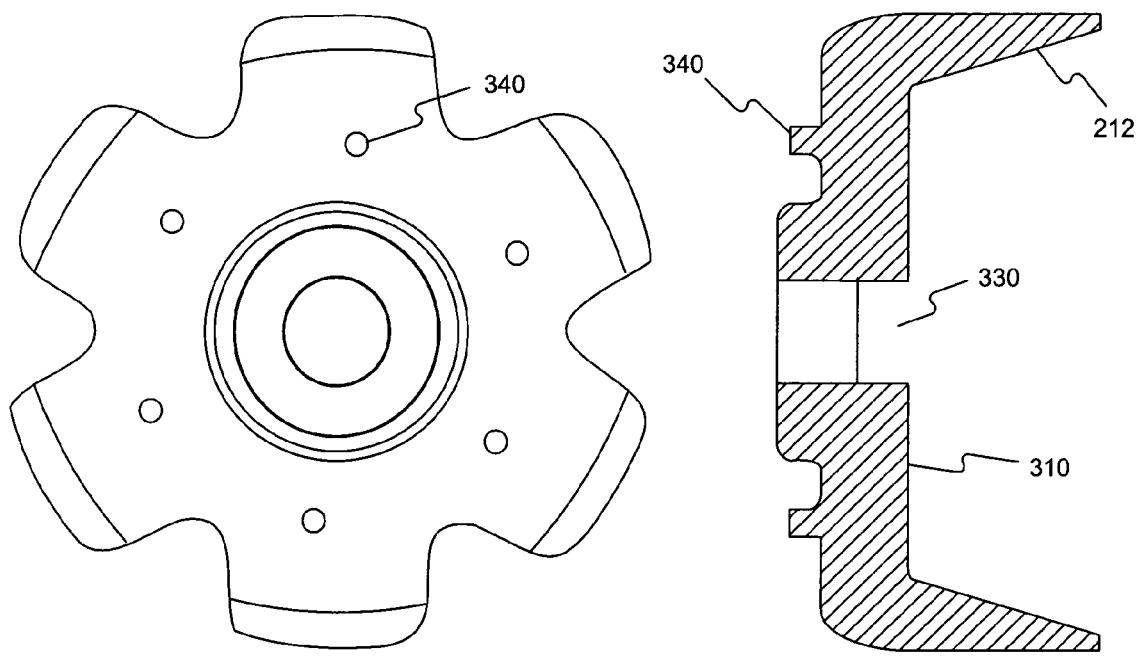
Fig. 3B　　　　Fig. 3C

SYSTEMS AND METHODS FOR FASTENING INTERNAL COOLING FANS TO CLAW-POLE ELECTRO-MECHANICAL MACHINES

TECHNICAL FIELD

The present invention generally relates to electro-mechanical machines and, more particularly, to fastening internal cooling fans to claw-pole segments of a claw-pole machine, such as an alternator.

BACKGROUND

Electro-mechanical machines are widespread. Rotating electro-mechanical machines, such as dynamoelectric machines (generators and alternators) and motors, are particularly prevalent, in both private and industrial applications. Rotating electromechanical machines usually include a stationary member, known as a "stator," about which a rotating member, known as a "rotor," turns. In certain types of machines, the rotor (sometimes referred to as an "armature") rotates within the stator (or "field"), which produces a rotating magnetic field. In other types of machines, the rotor produces a magnetic field, which produces an electrical current in the stator. Both stators and rotors may include one or more windings of conductors (for example, field windings) that carry current and/or generate magnetic fields and forces.

Several different rotating electro-mechanical machine designs exist. One common design is the Lundell, or "claw-pole," design. The claw-pole design is often used for dynamoelectric machines, such as alternators. In a claw-pole machine, the rotor includes claw-shaped pole segments (usually a pair of segments) located around one or more field windings. The pole segments have claw-shaped magnetic poles and are affixed around the winding such that the claws mesh together. FIG. 1 shows a conventional claw-pole rotor assembly 100 that may be used in an alternator. As illustrated, a pair of claw-pole segments (110) surround a field winding (120) and the claws (112) of the segments (110) intermesh.

Given the thermal conditions in which claw-pole machines often operate, proper cooling is vital to ensure proper and prolonged operation. Internal cooling fans are commonly used to cool claw-pole machines. For example, referring again to FIG. 1, rotor assembly 100 includes two internal cooling fans (131, 132). Internal cooling fans, such as fans 131 and 132, are usually attached to the pole segments by welding or frictional clamping.

Conventional internal cooling fan attachment techniques are deficient in a variety of aspects. With conventional techniques, the choice of internal cooling fan material is restricted. For example, in order to weld a fan to a pole segment, the fan must be formed from a suitable material, such as steel. Further, conventional attachment systems may be prone to fatigue and/or failure. Clamps and welds may degrade and eventually fail during prolonged operation. In addition, present attachment techniques do not account for fan alignment.

SUMMARY

Methods, systems, and articles of manufacture consistent with the present invention may obviate one or more of the above and/or other issues. Consistent with the present invention, methods, systems and articles of manufacture are disclosed for fastening internal cooling fans to claw-pole segments of claw-pole electro-mechanical machines, such as alternators.

Consistent with the present invention, a system for fastening internal cooling fans to claw-pole segments may be provided. The system may comprise: an electro-mechanical machine having a rotor that includes a claw-pole segment, the claw-pole segment having a base, at least one claw pole projecting axially from the base in a first direction, and at least one protrusion projecting axially from the base in a second direction opposite the first direction; and a fan assembly that attaches to the claw-pole segment, the fan assembly including at least one opening for receiving the at least one protrusion, wherein a portion of the at least one protrusion extends through and beyond the opening of the fan assembly when the fan assembly is mounted on the claw-pole segment and expands in response to an application of an axial load, to secure the fan assembly to the claw-pole segment.

Consistent with the present invention, a rotor claw-pole segment may be provided. The rotor claw-pole segment may comprise: at least one protrusion for insertion into at least one opening in a fan assembly; and a fastening material coupled to the at least one protrusion that extends through and beyond the at least one opening when the protrusion is inserted into the opening and expands in response to an application of an axial load to secure the fan assembly to the claw-pole segment.

Consistent with the present invention, an internal cooling fan assembly for use with a claw-pole segment of a rotor assembly may be provided. The fan assembly may comprise: a base portion that contacts the claw-pole segment when the fan assembly is mounted to the claw-pole segment, the base portion including a first opening to accommodate a shaft of the rotor and a plurality of second openings to accommodate a corresponding plurality of protrusions extending from the claw-pole segment so that the protrusions extend through and beyond the second openings when the fan assembly is mounted to the claw-pole segment; and a plurality of blades extending out at angles from the base portion, wherein a first of the plurality of blades is of a first configuration and a second blade of the plurality of blades is of a second configuration different from the first configuration.

Consistent with the present invention, a method of fastening a fan attachment to a claw-pole segment of an electro-mechanical machine may be provided. The method may comprise: forming the claw-pole segment to include at least one protrusion; forming the fan attachment to include at least one opening corresponding to the at least one protrusion; locating the fan attachment on the claw-pole segment such that the at least one opening receives the at least one protrusion and a portion of the at least one protrusion extends through and out of the at least one opening; and applying an axial force to the at least one protrusion to upset the portion extending out of the at least one opening such that the portion becomes larger than the opening to secure the fan attachment to the claw-pole segment.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings:

FIGS. 3A-C collaboratively illustrate a claw-pole segment consistent with the present invention;

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention. Other implementations may be used and structural and procedural changes may be made without departing from the scope of present invention.

Figure 1:
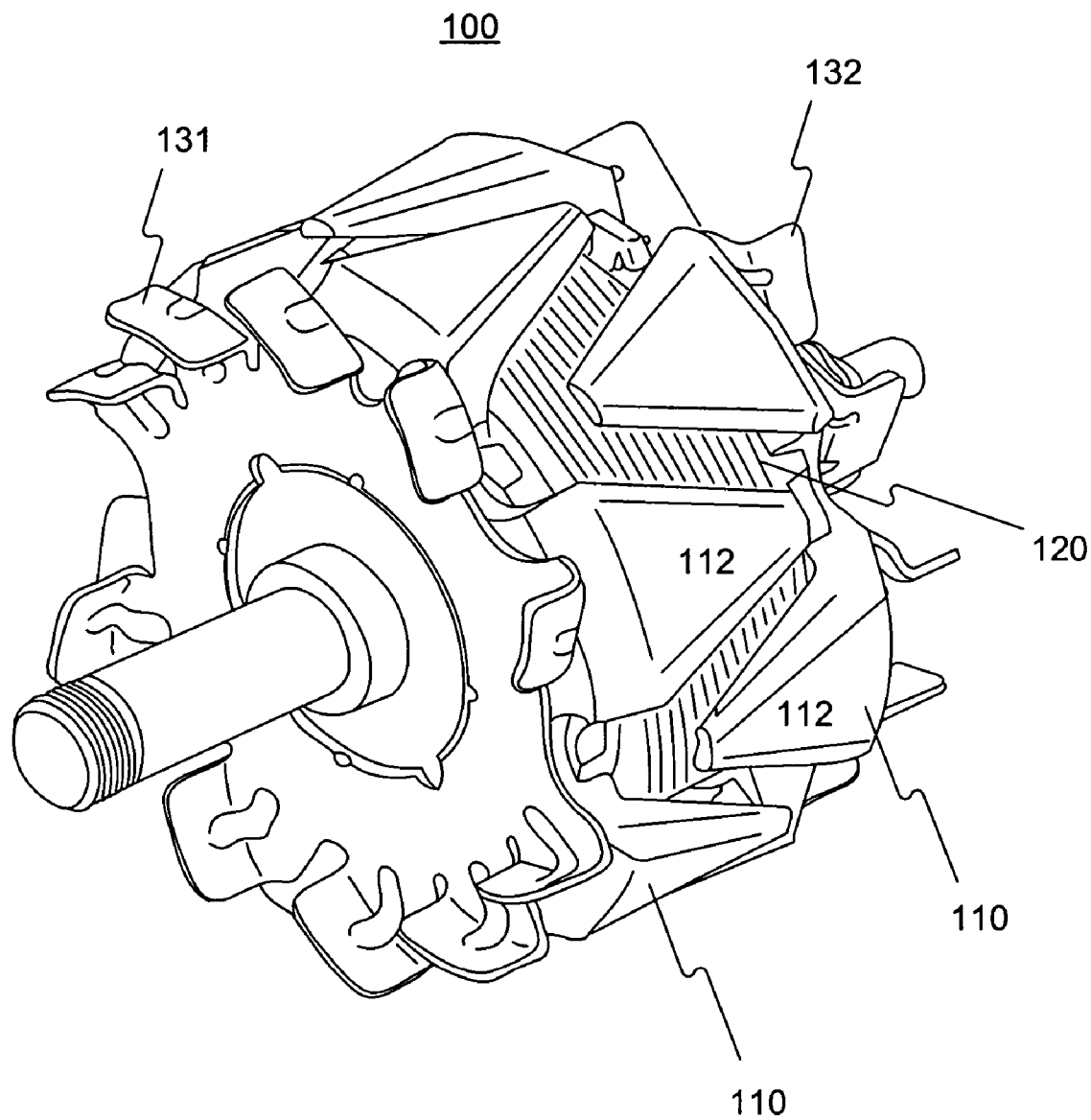
FIG. 1 illustrates a conventional claw-pole rotor assembly.
Figure 2:
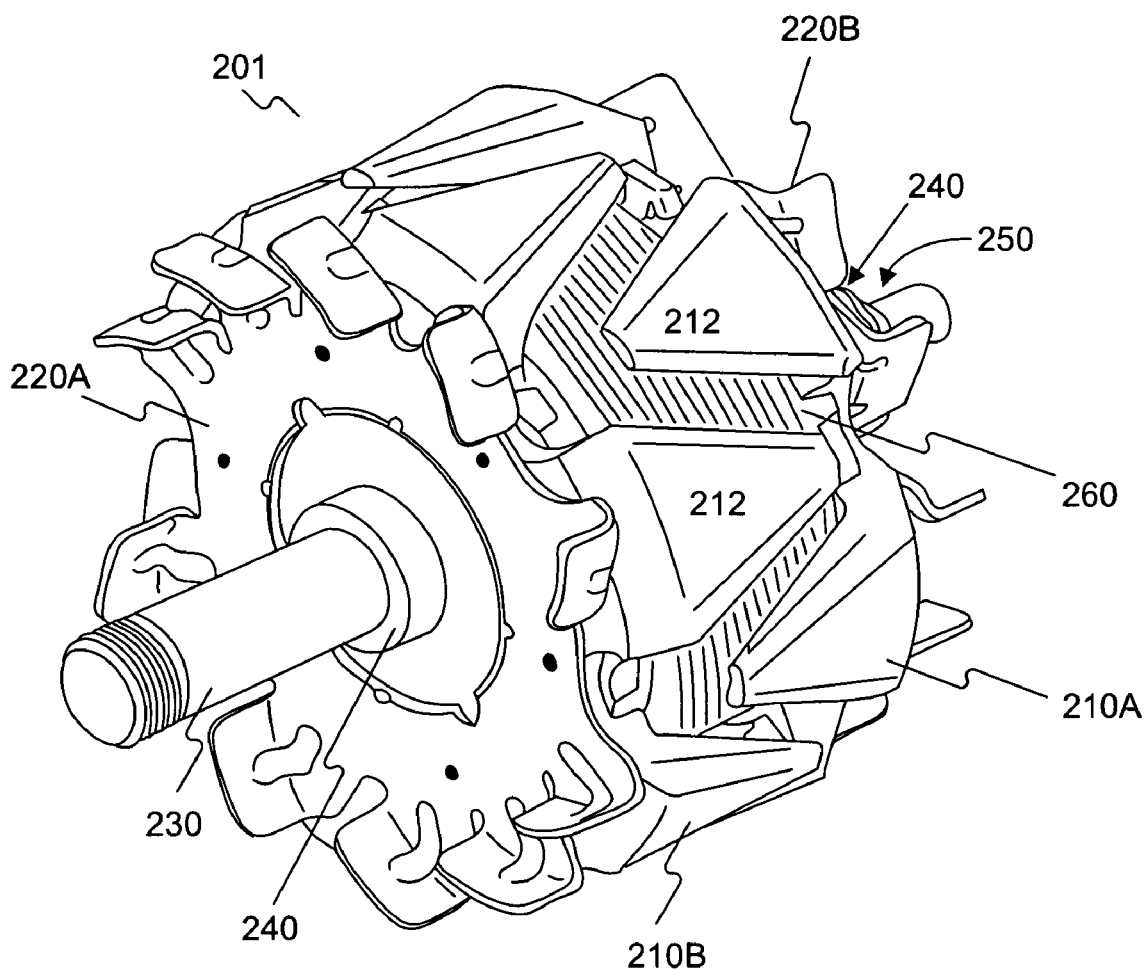
FIG. 2 illustrates an exemplary system consistent with the present invention.

FIG. 2 illustrates an exemplary system 200 consistent with the present invention. As illustrated, system 200 may include a claw-pole rotor assembly 201 suitable for use in an electro-mechanical machine (not shown). System 200 may also include one or more tools (also not shown) used for assembling rotor assembly 201. An example of such a tool is described below in connection with FIGS. 5A and 5B.

Rotor assembly 201 may be suitable for use and implemented in a variety electro-mechanical machines, such as machines that convert mechanical energy into electrical energy (i.e., dynamoelectric machines), machines that convert electrical energy into mechanical energy (e.g., motors), and various other rotating machines such as meters, torquers, etc. Rotor assembly 201 may also may suitable for use in a hybrid-drive motor. Rotor assembly 201 may be a component of and/or a located within such machines and systems. Rotor assembly 201 may be suitable for use in a variety of applications, including motor vehicle, material handling, marine, and off-road applications. In one particular example, rotor assembly 201 may be used in a claw-pole alternator for an automotive application. In such an implementation, rotor assembly 201 may be located within an alternator housing and may rotate about a stator.

Electro-mechanical machines in which assembly 201 may be implemented may include various components known in the art, such as stator assemblies, solenoid assemblies, controllers, pulleys, belts, springs, gears, brushes, casings, brackets, valves, seals, pins, sensors, terminals, external fan assemblies, etc. Such machines may also include appropriate air intake and discharge apertures (e.g., located in the casings and/or brackets) to facilitate air flow. In certain configurations, assembly 201 may additionally include or be coupled to one or more regulators (not shown) for adjusting voltage from a stator and one or more rectifiers (e.g., a diode rectifier bridge) (also not shown) for converting alternating current into direct current. Such regulators and rectifiers are known in the art.

Rotor assembly 201 may include one or more claw-pole segments 210 and one or more internal cooling fans 220. Rotor assembly 201 may also include various rotor components known in the art, such as a rotor shaft 230, one or more bearings 240, one or more slip rings 250 that supply electrical current to assembly 201, and one or more field coil windings 260 that generate magnetic flux. Consistent with the present invention, internal cooling fans 220 may be fastened to claw-pole segments 210 via one or more protrusions formed on claw-pole segment 210. Additional details of the protrusions, as well as details regarding fastening, are discussed below in connection with FIGS. 3-5.

In the configuration illustrated in FIG. 2, assembly 201 includes a pair of claw-pole segments (210A, 210B) and a corresponding pair of fans (220A, 220B). Assembly 201 may, however, include a fewer or greater number of claw-pole segments than what is illustrated in FIG. 2. For example, a third claw-pole segment may be interposed between two end segments. Likewise, assembly 201 may include a fewer or greater number of fans than the number illustrated.

Each claw-pole segment 210 of assembly 201 may include one or more claw-shaped poles 212. When affixed in assembly 201, the claw-pole segments 210 may surround one or more field windings and the claw-shaped poles 212 may intermesh. For example, the pair of claw-pole segments (210A, 210B) shown in FIG. 2 may be positioned around field coil windings 260 such that the claw poles 212 of each segment mesh together. The claw poles 212 may mesh such that every other claw pole is connected to a different end of the winding. In one configuration, the field coil winding may be located between each pole segment, resulting in a pair of field windings. During operation, current passes through the winding(s) and a magnetic field is generated, which is conducted by the claw poles 212.

Internal cooling fans 220 may be configured to draw and drive air to provide ventilation to rotor assembly 201. For example, fan 220A may drive air into the drive end of the assembly and fan 220B may draw air into the slip ring end of the assembly. In one example, internal cooling fans 220 may include centrifugal fans, each including a plurality of blades located around an impeller. Internal cooling fans 220 may operate in conjunction with appropriate air intake and discharge apertures of an electro-mechanical machine in which assembly 210 is implemented to facilitate air flow.

FIGS. 3A-C illustrate detailed views of an example of a claw-pole segment 210 consistent with the present invention. Claw-pole segment 210 may include a base portion 310, and one or more claw-shaped magnetic poles 212 extending from the base. As illustrated in FIGS. 3A-C, the base portion 310 may be circular in shape and the claw-shaped poles 212 may be positioned around the circumference of the base, projecting axially from the base. Base 310 may include an opening 330 in its center so that it can be inserted on a rotor shaft (e.g., shaft 230). The particular diameter of opening 330 will vary dependent upon the application. The claw poles 212 may be evenly spaced around base 310 and may be formed with a tapered shape. In one example, claw-pole segment 210 may include P/2 claw poles, where P is an even number representing the total number of poles. The exact number of claw poles, as well as their particular size, shape, and positioning, will vary depending on the particular machine and application and are not limited to what is shown in FIGS. 2 or 3. Similarly, the size and shape of the base portion will vary and are not limited to what is illustrated.

Consistent with the present invention, claw-pole segment 210 may include one or more protrusions 340 for attaching an internal cooling fan (e.g., fan 220) to the segment. As shown in FIGS. 3A-3C, the protrusions may be formed on base 310 of claw-pole segment 210 and may extend axially from the base in a direction opposite the direction in which the claw poles extend. That is, the protrusions may be formed on the face of base 310 opposite the face from which claw poles 212 extend. Protrusions 340 may be formed in various shapes and sizes, depending on the application. In one example, protrusions 340 may be posts or pin-shaped. In addition, the protrusions may be tapered. In one particular example, each protrusion may be pin-shaped and tapered, having a 5.5 mm nominal diameter at the protrusion base and extending 4.8 mm out from base 310 with a 2-degree draft. Any number of protrusions 340 may be formed on claw-pole segment 300. Further, protrusions may be positioned in various arrangements and patterns on claw-pole segment 210. In the configuration illustrated in FIG. 3A, claw-pole segment 210 may include six protrusions 340 positioned in a circular arrangement on the base.

Consistent with the present invention, each protrusion 340 may include a head portion that is upset by the application of an axial load or upset force. For example, the head portion may expand in response to an axial load similar to a rivet. In one implementation, each protrusion 340 may include a head portion that expands to 6.5-6.6 mm in response to an axial load. The amount of force or pressure required to upset the protrusion head will vary, depending on the application. Similarly, protrusions 340 may be formed to withstand various amounts of stress, depending on the application. In one example, protrusions 340 may withstand 7000 N and the protrusion heads may upset upon application of 24000 N.

In certain implementations, each of the base portion 310, poles 320, and protrusions 340 of claw-pole segment 210 may be formed from the same material, which may include, for example, a metal, such as steel, iron, and aluminum, or an alloy. In addition, the head portions of protrusions 340 may be made of the same material as the protrusions, and a given protrusion and its head portion may be a single piece. Claw-pole segment 210, including base portion 310, poles 320 and protrusions 340, may be formed, or fabricated, using a variety of techniques/processes. For example, claw-pole segment 210 may be formed using various forging processes, such as impression die forging, precision forging, press forging, upset forging. Claw-pole segment 210 may be forged using hot, warm or cold forging. In addition, claw-pole segment 210 may be formed using various machining processes and/or casting processes, such as centrifugal casting and die-casting. Various computer aided techniques, such as CAD, CAM, and CAE, may be used with the various forming processes.

In one particular example, claw-pole segment 210 may be formed using a hot forging process. The forging process may include forming heated metal into a specialized mold or die. The specialized mold may have the desired shape of the claw-pole segment, including the base, claws, and protrusions. The metal may be formed using compressive force, which may be provided by a press or power hammer.

Figure 4A:
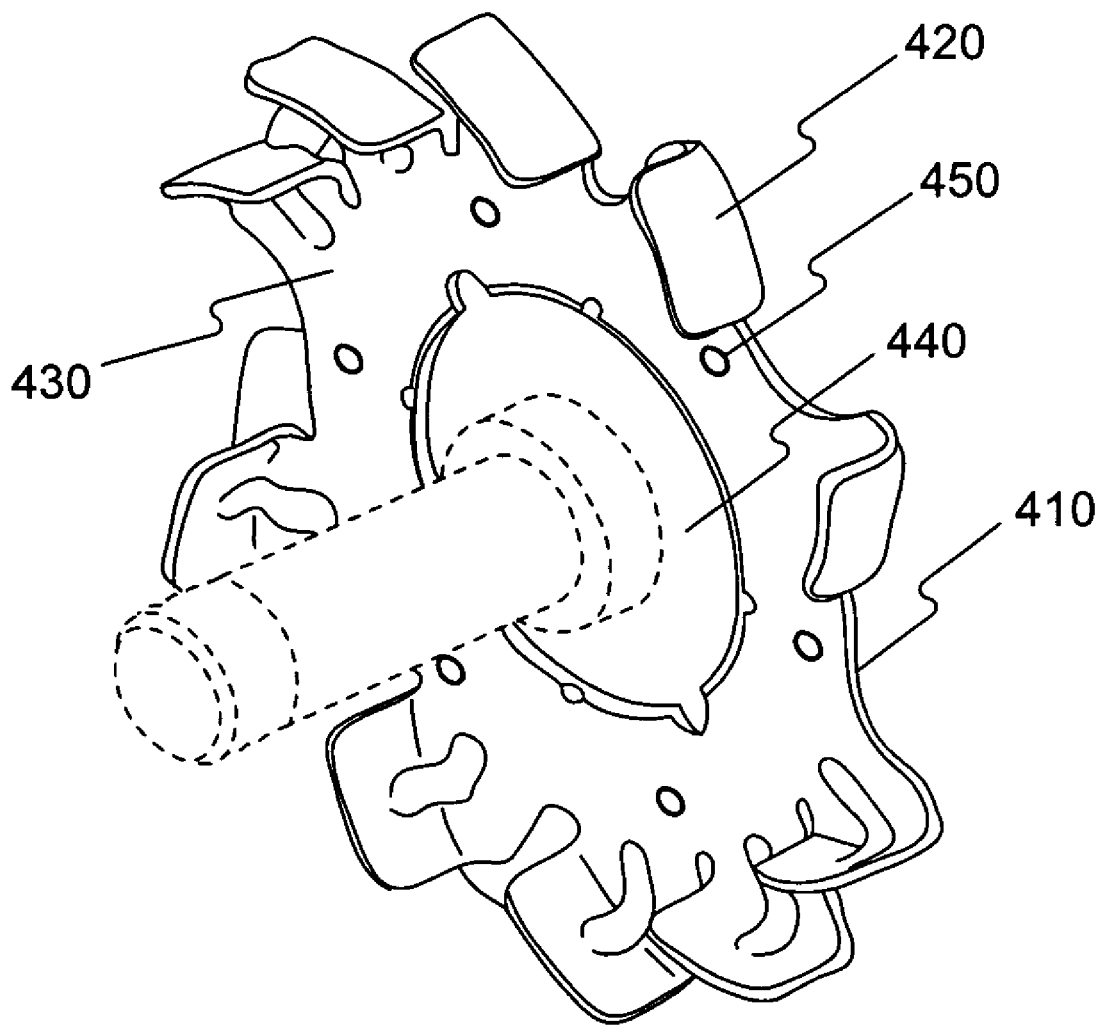
FIG. 4A illustrates an exemplary internal cooling fan assembly consistent with the present invention.

FIG. 4A illustrates a detailed view of an example of an internal cooling fan 220 consistent with the present invention. Internal cooling fan 220 may include a base portion that makes contact with a given claw-pole segment when the fan is mounted on the claw-pole segment and one or more fan blades extending out at angles from the base portion such that they do not contact the claw-pole segment when mounted. As illustrated in FIG. 4A, internal cooling fan 220 may include a circular base portion 410, with one or more fan blades 420 dispersed around the periphery of the base's outwardly directed face 430. Although illustrated as circular, internal cooling fan 220 may be formed in a variety of other shapes. Internal cooling fan 220 may include an opening 440 in base 410 so that it can be inserted on a rotor shaft (e.g., shaft 230). The particular diameter of opening 440 will vary dependent upon the application. In one example, opening 440 may have a 45 mm inner diameter (ID). Fan blades 420 may project out axially from base 410 such that air can be drawn in and driven between the blades. The dimensions of cooling fan 220 and the number of fan blades will vary depending on the particular claw-pole segment and machine. In one example, base portion 410 may be 50 mm in diameter, with a 1.2 mm thickness. It may also include 6 blades, each 27 mm (length)×16 mm (width) in size.

Consistent with the present invention, internal cooling fan 220 may include one or more openings 450 for receiving the protrusions on a given claw-pole segment. The openings 450 may be located in base 410 or in a portion of the fan blades. The number, size, and arrangement of the openings will vary depending on the particular claw-pole segment and machine. In one example, cooling fan 220 may include six openings spaced in a circular pattern in base 410, each 5.65 mm in diameter to accommodate the protrusions.

Internal cooling fan 220 may be formed from a variety of materials, such as plastics, resins (such as, acrylic, Acrylonitrile-Butadiene-Styrene (ABS), epoxies, etc.), metals (such as steel and aluminum), alloys, and composite materials. In one particular example, internal cooling fan 220 may be formed from plastic. Internal cooling fan 220 may be fabricated using a variety of forming and/or molding techniques, such as thermoforming, injection molding, and pressure forming. Forging, casting and/or machining may also be used.

Figure 4B:
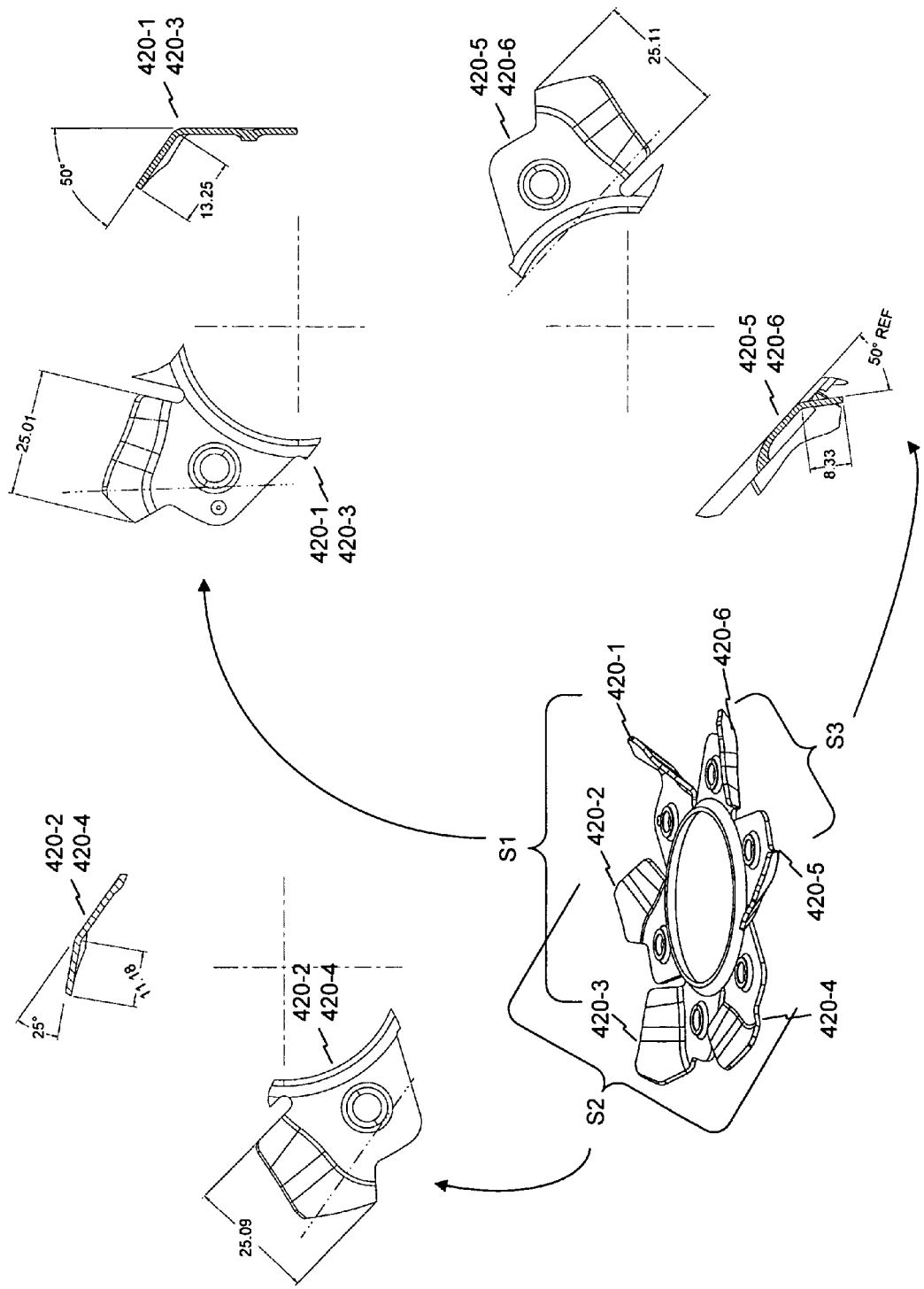
FIG. 4B illustrates an exemplary internal cooling fan assembly configuration consistent with the present invention.

In one implementation, the fan blades of a given internal cooling fan may be formed with varying configurations (e.g., size, shape, spacing, angle, etc.) to affect (e.g., lower or brake up) the frequency response of the fan. That is, one or more of the blades of a particular fan may have a different size, shape, spacing, and/or angle from one or more other blades of the fan. FIG. 4B illustrates an internal cooling fan 475 that includes fan blades that vary in size, spacing, and angle.

Internal cooling fan 475 may include a base portion 480 that makes contact with a given claw-pole segment when the fan is mounted, and it may include one or more fan blades 420 extending out at various angles from the base portion such that they do not contact the claw-pole segment when mounted. Similar to fan 220, internal cooling fan 475 may include an opening 490 in its base so that it can be inserted on a rotor shaft (e.g., shaft 230). The particular diameter of opening 490 will vary dependent upon the application. Internal cooling fan 475 may be formed from various materials and by using various techniques, such as those described above in connection with fan 220.

In an exemplary configuration, the fan blades of internal cooling fan 475 may be arranged in one or more blade sets. As illustrated, internal cooling fan 475 may include six blades (420-1, 420-2, 420-3, 420-4, 420-5, and 420-6) that are arranged in three sets of two (S1, S2, and S3). The number of blades and sets are not limited to what is illustrated. For example, in an alternative implementation, fan 475 may include seven blades arranged in two three-blade sets and one one-blade set, or in three two-blade sets and one one-blade set. Blades in a particular set may be adjacent to each other or may be dispersed between blades of other sets. For example, as illustrated in FIG. 4B, the first set (S1) may include the first (420-1) and third (420-3) blades, the second set (S2) may include the second (420-2) and forth (420-4) blades, and the third set (S3) may include the fifth (420-5) and sixth (420-6) blades. In that arrangement, the first and second sets are intermeshed and the blades of the third set are adjacent.

Each blade in a given set may be identical in shape, size, and angle, but each set may be different from every other set. As an example, referring again to FIG. 4B, the blades in the first set (S1) may be 25 mm×15 mm in size and set at a 56-degree angle with respect to the base portion, the blades in the second set (S2) may be 25 mm×12 mm in size and set at a 20 degree angle, and the blades in the third set (S3) may be 25 mm×13 mm in size and set a 40 degree angle. Each set of blades may be unequally spaced from other sets on the fan. Also, the space between each blade in a set may vary in each of the sets.

Similar to internal cooling fan 220, fan 475 may include one or more openings 495 in its base for receiving the protrusions on a given claw-pole segment. The openings may be arranged to accommodate the spacing, shape, size, and angle of the fan blades. In one example, openings 495 may be unequally spaced to accommodate unequally spaced blades. Alternatively, the openings may be equally spaced around the fan but positioned differently with respect to each blade.

As noted above, internal cooling fan 220 (or fan 475) may be fastened or attached to a claw-pole segment (e.g., 210) using protrusions 340 formed on the claw-pole segment. The fan may be located (using the protrusions) on the claw-pole segment such that the protrusions extend through and beyond the corresponding openings in the fan (e.g., 2.0-2.5 mm beyond the openings). The portions of the protrusions extending beyond the openings in the fan may be upset by an axial load to secure the fan attachment to the claw-pole segment.

Figure 5A:
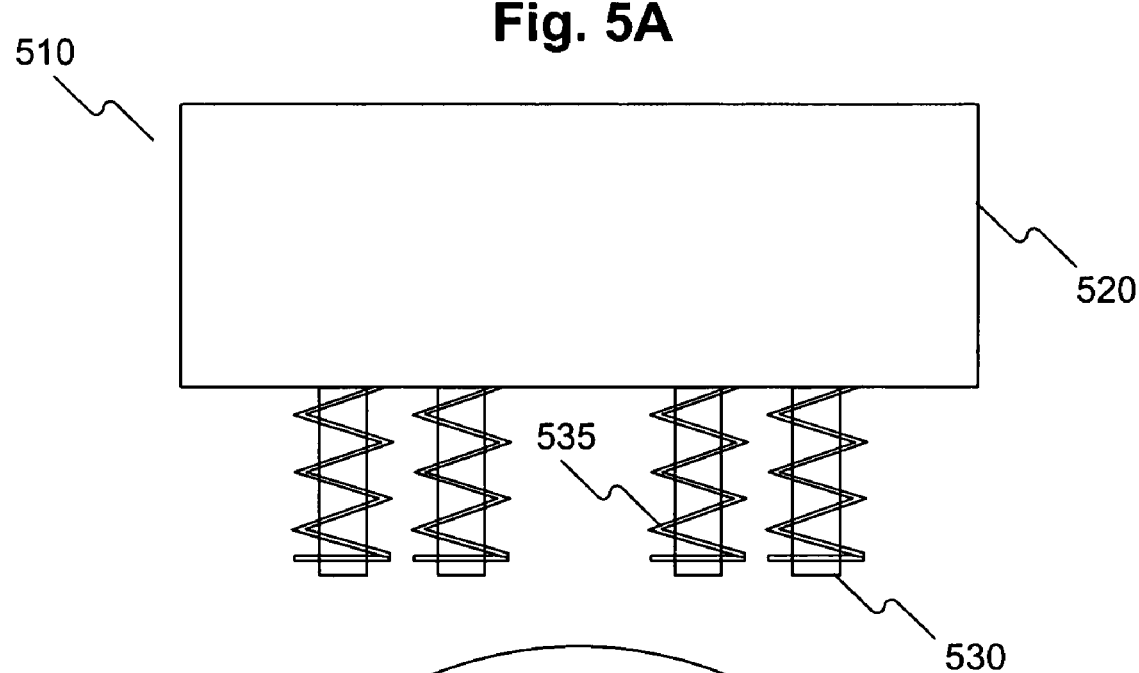
FIGS. 5A and 5B collaboratively illustrate views of an exemplary upset tool consistent with the present invention.
Figure 5B:
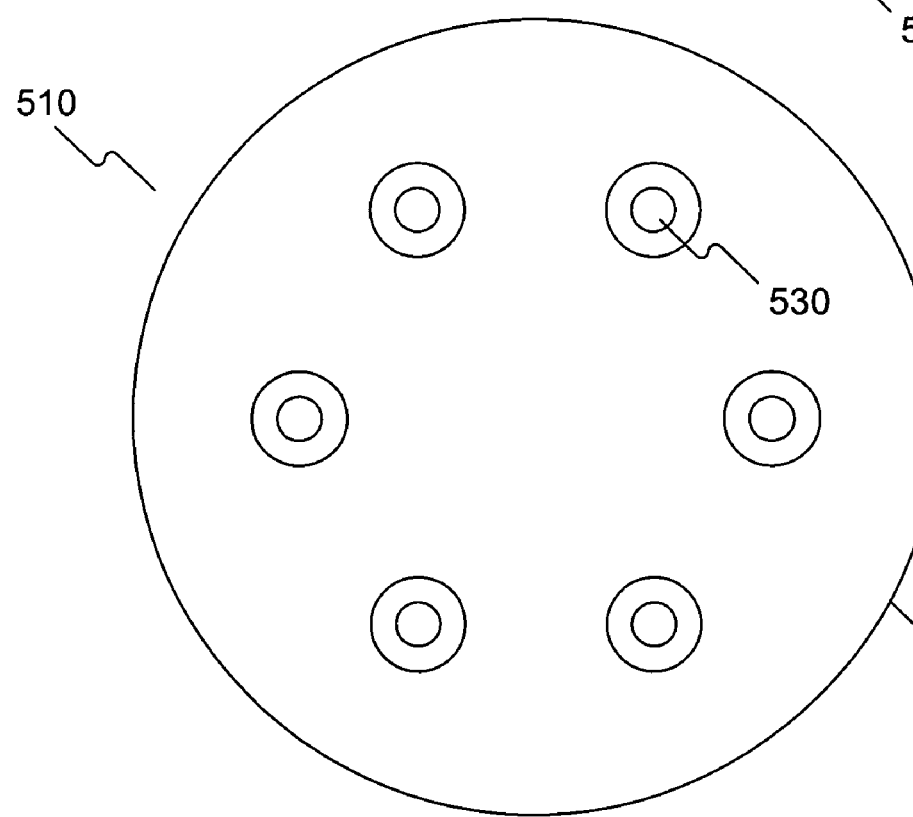

FIGS. 5A and 5B collaboratively illustrate views of an exemplary upset tool 510 that may apply an axial load to the protrusions to secure internal cooling fans (220, 475) to claw-pole segment 340. As illustrated in FIGS. 5A and 5B, upset tool 510 may include a base 520 and a plurality of rods 530 extending out from the base. Each rod 530 may be surrounded by a spring 535. Rods 530 may correspond to the protrusions on a given claw-pole segment. The number of rods will therefore vary depending on the application. In one implementation, each of rods 530 may be 10 mm in diameter and extend 20 mm from base 520, which may be 50 mm in thickness with a 110 mm diameter. The size of the rods and the base may vary depending on the particular claw-pole segment and the size of its protrusions. Base 510 and rods 530 may, in one example, be formed from steel.

Upset tool 510 may include a drive mechanism (not shown) for driving base 520 and rods 530 with varying amounts of force to provide axial loads to claw-pole segment protrusions. Upset tool 510 may be configured to apply an axial load sufficient to provide each protrusion with an adequate upset force. For example, if the claw-pole segment includes six protrusions, upset tool 510 may be configured to apply an axial load of 35000 lbs, providing approximately 5800 lbs to each protrusion. The drive mechanism may utilize various known components and technologies, such as hydraulics, motors, etc.

In operation, springs 535 may contact the fan assembly to hold it in place while base 510 and rods 530 are driven to apply an axial load to the claw-pole segment protrusions. The axial load may upset the protrusions, thereby securing the fan to the claw-pole segment.

For purposes of explanation only, aspects of system 200, including claw-pole segment 210, internal cooling fans 220 and 475, and upset tool 510 are described with reference to the elements and components illustrated in FIGS. 2-5. The number, shape and arrangement of components in claw-pole segment 210, fans 220 and 475, and upset tool 510 are not limited to what is shown and other variations in the number, shape and arrangement of components are possible, consistent with the present invention. Further, depending on the implementation, system 200, claw-pole segment 210, fans 220 and 475, and upset tool 510 may lack certain illustrated components and/or contain, or be coupled to, additional or varying components not shown.

Figure 6:
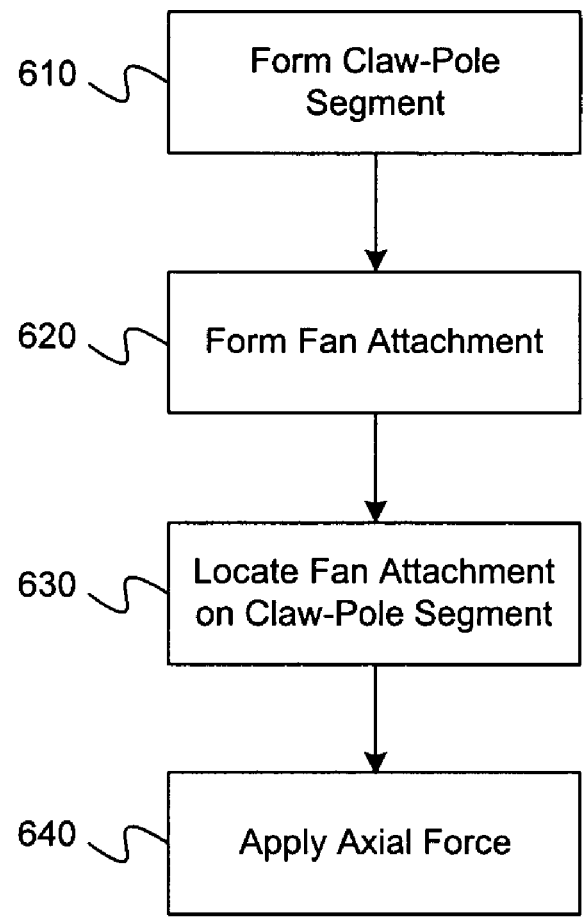
FIG. 6 is a flowchart depicting an exemplary coil forming method consistent with the present invention.

FIG. 6 is a flowchart depicting an exemplary method 600 of fastening a fan attachment to a claw-pole segment of a rotating machine consistent with the present invention. Method 600 may be used to fasten internal cooling fan 220, or fan 475, to a claw-pole segment 210.

Method 600 may begin by forming the claw-pole segment (step 610). Forming the claw-pole segment may include forging, casting, and/or machining the claw-pole segment. The claw-pole segment may be formed such that it includes a base portion, claws, and protrusions, as discussed above in connection with FIG. 3. In certain embodiments, forming the claw-pole segment may include generating a specialized mold or die that can be used for fabricating the claw-pole segment. Method 600 may also include forming the fan attachment (step 620). Forming the fan attachment may include performing one or more forming and/or molding techniques, such as thermoforming, injection molding, pressure forming, forging, casting and/or machining. Forming the fan attachment may include forming one or more openings in the attachment that correspond to the protrusions of a given claw-pole segment. In certain embodiments, the claw-pole segment and fan attachment may be formed using one or more forming machines, which may be automated.

After the claw-pole segment and fan attachment are formed, the fan attachment may be located on the claw-pole segment (step 630). The protrusions may serve as guide for aligning and locating the fan on the claw-pole segment. The fan attachment may be located such that the openings receive the protrusions and a portion of each protrusion (e.g., 2.0-2.5 mm of each protrusion) extends through and out of the respective opening. Locating may be performed manually by hand or, as an alternative, automatically by one or more tools, which may be automated.

Once the fan attachment is located on or aligned with the claw-pole segment, an axial force may be applied to the protrusions of the claw-pole segment (step 640). The axial force may be applied in order to upset the portions of the protrusions extending out of the fan attachment openings such that those portions becomes larger than the openings. In this fashion, the protrusions may operate similar to rivets to secure the fan attachment to the claw-pole segment. Applying the axial load to the protrusions may be performed by one or more tools, which may be automated, such as upset tool 510.

FIG. 6 is consistent with an exemplary implementation of the present invention. The sequence of events described in FIG. 6 is exemplary and not intended to be limiting. Other steps may therefore be used, and even with the method depicted in FIG. 6, the particular order of events may vary without departing from the scope of the present invention. Further, the illustrated steps may overlap and/or may exist in fewer steps. Moreover, certain steps may not be present and additional steps may be implemented in method 600. The illustrated steps may also be modified without departing from the scope of the present invention. In addition, the method 600 is not inherently related to any particular apparatus or system and may be implemented in conjunction with any suitable combination of components. Also, all or part of method 600 may be automatically performed without operator intervention.

The foregoing description of possible implementations consistent with the present invention does not represent a comprehensive list of all such implementations or all variations of the implementations described. The description of only some implementations should not be construed as an intent to exclude other implementations. Artisans will understand how to implement the invention in the appended claims in many other ways, using equivalents and alternatives that do not depart from the scope of the following claims.

What is claimed is:

1. A system comprising:
   an electro-mechanical machine having a rotor that includes a claw-pole segment, the claw-pole segment having a base, at least one claw pole projecting axially from the base in a first direction, and at least one protrusion projecting axially from the base in a second direction opposite the first direction; and
   a fan assembly that attaches to the claw-pole segment, the fan assembly including at least one opening for receiving the at least one protrusion, a portion of the at least one protrusion extending through and beyond the opening of the fan assembly when the fan assembly is mounted on the claw-pole segment and expanding in response to an application of an axial load, to secure the fan assembly to the claw-pole segment; and
   the fan assembly including a plurality of fan blades arranged in at least a first set and a second set, the first set including blades of a first configuration and the second set including blades of a second configuration different from the first configuration.

2. The system of claim 1, wherein the electro-mechanical machine includes an alternator.

3. The system of claim 1, wherein the electro-mechanical machine includes a generator.

4. The system of claim 1, wherein the fan assembly is formed at least in part from plastic.

5. The system of claim 1, wherein the alternator claw-pole segment is formed from steel.

6. The system of claim 1, wherein the alternator claw-pole segment is formed using a hot forging machine.

7. The system of claim 1, further comprising a fastening tool for applying the axial load to the at least one protrusion.

8. The system of claim 7, wherein the fastening tool applies the axial load using at least one of air pressure, hydraulics, and a motor.

9. The system of claim 1, wherein the fan assembly includes a plurality of fan blades, and wherein at least a first one of the fan blades is of a first size and at least a second one of the fan blades is of a second size, different from the first size.

10. The system of claim 9, wherein the first fan blade is set at a first angle and the second fan blade is set at a second angle, different from the first angle.

11. The system of claim 1, further comprising an upset tool configured to apply the axial load to the at least one protrusion.

12. The system of claim 11, wherein the upset tool includes at least one rod extending from a base, the rod corresponding to the at least one protrusion and operable to apply the axial load to the at least one protrusion.

13. An internal cooling fan assembly for use with a claw-pole segment of a rotor assembly, the fan assembly comprising:
   a base portion that contacts the claw-pole segment when the fan assembly is mounted to the claw-pole segment, the base portion including a first opening to accommodate a shaft of the rotor and a plurality of second openings to accommodate a corresponding plurality of protrusions extending from the claw-pole segment so that the protrusions extend through and beyond the second openings when the fan assembly is mounted to the claw-pole segment; and
   a plurality of blades extending out at angles from the base portion, the plurality of blades arranged in sets, wherein the first blade is a member of a first set and the second blade is a member of a second set.

14. The internal cooling fan assembly of claim 13, wherein a third blade of the plurality of blades is of a third configuration different from the first and second configurations.

15. The internal cooling fan assembly of claim 13, wherein the first configuration includes a first blade size and the second configuration includes a second blade size.

16. The internal cooling fan assembly of claim 13, wherein the first configuration includes a first blade angle with respect to the base portion and the second configuration includes a second blade angle with respect to the base portion.

17. The internal cooling fan assembly of claim 13, wherein the first configuration includes a first blade size and a first blade angle with respect to the base portion and the second configuration includes a second blade size and a second blade angle with respect to the base portion.

* * * * *